United States Patent [19]

Smith

[11] 4,073,842
[45] Feb. 14, 1978

[54] METHOD FOR PREPARING FOAM PLASTIC LOOSE FILL PACKING

[75] Inventor: Layle V. Smith, Midland, Mich.

[73] Assignee: The Dow Chemical Company, Midland, Mich.

[21] Appl. No.: 368,793

[22] Filed: June 11, 1973

Related U.S. Application Data

[63] Continuation of Ser. No. 182,137, Sept. 20, 1971, abandoned, which is a continuation-in-part of Ser. No. 831,572, June 9, 1969, abandoned.

[51] Int. Cl.² .................. B29D 27/00; B29B 1/03
[52] U.S. Cl. .................................. 264/53; 264/143; 264/150; 425/380; 425/461
[58] Field of Search ............... 264/51, 53, 54, 150, 264/151, 177 R, 209, 210 R, 143, 148; 425/206, 207, 208, 376, 380, 461

[56] References Cited

U.S. PATENT DOCUMENTS

| | | | |
|---|---|---|---|
| 2,528,528 | 11/1950 | Lyon | 264/151 |
| 3,026,274 | 3/1962 | McMillan et al. | 264/53 |
| 3,033,806 | 5/1962 | Spencer | 264/53 |
| 3,066,382 | 12/1962 | Zweigle et al. | 264/51 |
| 3,385,917 | 5/1968 | Breukink et al. | 425/380 |
| 3,400,037 | 9/1968 | Sare et al. | 264/51 |
| 3,632,705 | 1/1972 | Makowski | 264/210 R |

FOREIGN PATENT DOCUMENTS 215,146  10/1957  Australia ............... 425/380

OTHER PUBLICATIONS

"Plastifying Extrusion" by Louis Street, *Int. Plastics Engr.*, July 1961, pp. 3-10.

*Primary Examiner*—James B. Lowe
*Attorney, Agent, or Firm*—R. B. Ingraham

[57] ABSTRACT

Loose fill foam plastic packing is prepared by extruding an expandable plastic composition to form an unfoamed or unexpanded strand which is subsequently cut into short lengths and foamed, the improvement which comprises extruding the strand through a generally helical passageway. The strand on foaming has a generally helical configuration.

6 Claims, 5 Drawing Figures

INVENTOR.
Layle V. Smith
BY
AGENT

METHOD FOR PREPARING FOAM PLASTIC LOOSE FILL PACKING

This application is a continuing application of my copending application Ser. No. 182,137, filed Sept. 20, 1971, now abandoned which in turn was a continuation-in-part application of my earlier filed application Ser. No. 831,572, filed June 9, 1969, now abandoned.

A wide variety of pour-type or loose fill packings are prepared from foamable plastics. Some of such packings are set forth in U.S. Pat. Nos. 3,066,382; 3,251,728; 3,188,264 and 3,047,136, the teachings of which are herewith incorporated by reference. A particular characteristic of such a foam plastic loose fill packing which is desirable is that it flow relatively freely under the influence of gravity; that is, when it is used for packaging it may be readily dispensed from a conical hopper, and that it offer substantial resistance to relative movement of the particles when the particles are under pressure such as when enclosed in the shipping carton together with an item to be shipped. Spherical particles are generally unsatisfactory for such packaging and particles such as those described in U.S. Pat. No. 3,066,382 provide exceptional resistance to relative movement within the package but are dispensed only with difficulty. One form of strand that is eminently suited for many applications in loose fill packaging is a foamed strand having a generally helical configuration which advantageously is foamed by forming an unfoamed strand of a generally helical configuration and subsequently foaming the strand to prepare the desired product.

The present invention is concerned with an improved method for the preparation of foamable plastic strands of a generally helical configuration and with providing a simple method for the preparation of such strands.

These features and other advantages in accordance with the present invention are achieved in the method of the present invention wherein a heat plastified synthetic resinous composition is extruded to form at least one strand of a foamable synthetic resinous composition, severing the strand in the unfoamed condition to provide a plurality of strand segments which, on subsequent heating, form an expanded or foamed strand segment, the improvement which comprises extruding the thermoplastic composition at a temperature at which it is thermoplastic and below the foaming temperature thereof through a generally helical passageway immediately prior to passing the strand from an extrusion die.

The method of the present invention is advantageously practiced employing apparatus which comprises in cooperation combination means to provide a stream of heat plastified synthetic resinous material in operative combination with a die member, the die member having at least one discharge passage, the discharge passage having a generally helical configuration, means to cool a strand issuing from said die and means to sever said strand into a plurality of particle segments.

Further features and advantages of the present invention will become more apparent from the following specification taken in connection with the drawing wherein:

FIG. 1 schematically depicts a strand prepared in accordance with the method of the present invention.

Figure 5:
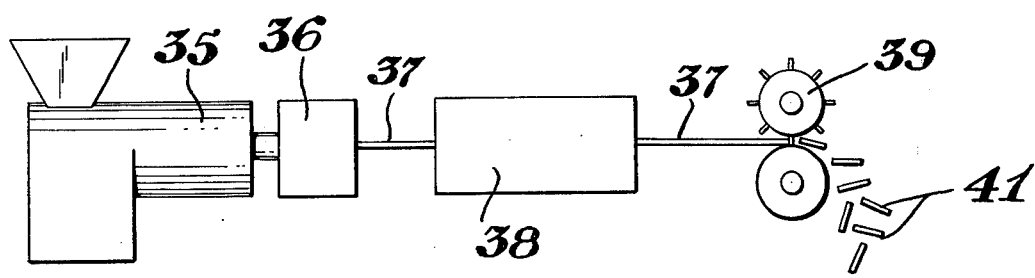

FIG. 5 schematically depicts apparatus for the preparation of foamable strands.

Figure 1:

In FIG. 1 there is schematically depicted a helical strand of synthetic resinous plastic material generally designated by the reference numeral 10. The configuration of the strand 10 is generally the same whether it be composed of unfoamed foamable material or foamed foamable material.

Figure 2:
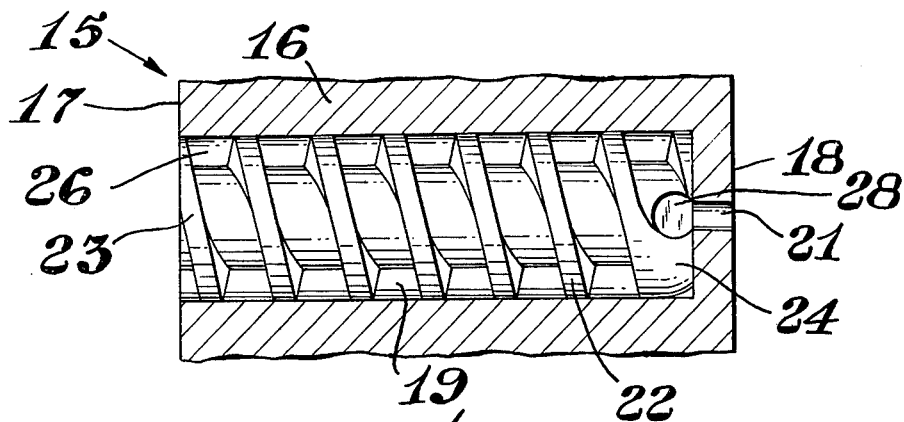
FIG. 2 is a schematic fractional sectional view of a die suitable for the preparation of strands in accordance with FIG. 1.

In FIG. 2 there is shown a schematic sectional representation of a portion of a die generally designated by the reference numeral 15 adapted to prepare a strand such as the strand 10 of FIG. 1. The die 15 comprises a die body 16 having a feed or inlet end 17 and a discharge or outlet end 18. The die 16 defines a generally cylindrical cavity 19 in full communication with the end 17 and a discharge passageway or extrusion orifice 21 communicating with the cylindrical cavity 19 and spaced external to the discharge end 18 of the die 16. An insert 22 is disposed within the cavity 19. The insert 22 has a generally cylindrical configuration and has a feed end 23 disposed adjacent the inlet end 17 and a discharge end 24 disposed adjacent the discharge orifice 21 of the die 16. The insert 22 has formed therein a generally helical recess 26 extending the entire length of the insert 22. The recess 26 is adapted to receive polymeric material at the feed end 17 of the die 16 and discharge material to a generally radially disposed slot 28 in the discharge end 24 of the insert 22. The radial slot 28 is in full communication with the discharge slot 21.

Figure 3:
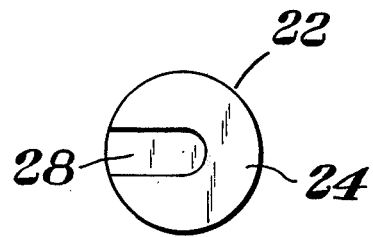
FIG. 3 is an end view of the insert employed in FIG. 2.

FIG. 3 depicts an end view of the insert 22 showing the location of the radial slot 28 which communicates with the passageway 21.

In operation of the apparatus of FIGS. 2 and 3 in the practice of the method of the present invention, heat plastified synthetic resinous material which is capable of expansion after extrusion is supplied under extrusion pressure and temperature to the first end 17 of the die 16. The synthetic resinous material flows within a helical passage defined between the die body 16 and the insert 22, a passage having a configuration of the groove 26 of the insert 22. As the plastic material passes through the helical groove, molecular orientation is imparted in a direction of flow during the traverse of the helical groove. The oriented stream of plastic material leaves the helical groove 26, passes into the relatively short transverse groove 28 and is discharged through the relatively short discharge passageway 21. As the extrudable viscoelastic melt has been oriented by the relatively long passage through the helical groove, the extrusion is conducted at such a rate that insufficient time elapses between having the helical groove and being discharged from the passageway 21 to permit loss of the helical orientation. The orientation of the resultant strand is time and temperature dependent and therefore it is generally desirable to extrude at as low a temperature as possible in order to maintain the desirable orientation in the resultant strand. Beneficially, the strand is cooled on emergence from the opening 21 if unfoamed strands are required or extruded at a temperature sufficiently high to permit expansion when the strand leaves the opening 21. Advantageously, a die such as the die 15 employs any desired number of extrusion orifices each in association with a suitable helical passageway.

Figure 4:
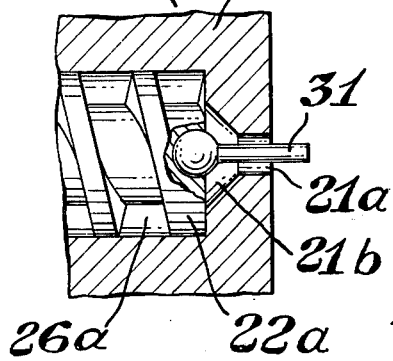
FIG. 4 is a schematic view of an alternate embodiment of a die suitable for the preparation of hollow strands.

An alternate embodiment for practice of the method of the invention is set forth in FIG. 4 designated by the reference numeral 15a. The embodiment 15a comprises a die body 16a having a discharge passageway 21a. The discharge passageway 21a has an inwardly directed outwardly flaring passage portion 21b adjacent an insert 22a. A mandrel 31 is affixed to the insert 22a and is generally coaxially positioned within the discharge passageway 21a and is in operative communication with a helical groove 26a.

Operation of the embodiment of FIG. 4 accomplishes molecular orientation in a manner similar to the embodiment of FIG. 2. However, the addition of the mandrel 31 causes the extrudate to be in tubular form which is highly desirable wherein packing material of minimal density is required.

FIGS. 2, 3 and 4 show particularly convenient die adaptations which permit the extrusion of strands having molecular orientation and a tendency to foam in a generally helical configuration. Other obvious variations are readily made. The embodiments of FIGS. 2, 3 and 4 permit ready modification of conventional die plates wherein an insert is readily prepared by external threading to form the helical groove such as the groove 26, and milling to obtain the radial passageway 28, and fitted to a corresponding opening prepared in the die plate. Helical passages can be formed in the die plate if desired employing electrical discharge machining or grinding employing an ultrasonically driven tool.

FIG. 5 schematically depicts the operation of the apparatus for practice of the method of the present invention. An extruder 35 provides a stream of heat plastified synthetic resinous material containing a foaming or expanding agent to a die 36. The die 36 has a plurality of openings associated with helical passages 26 and 26a such as depicted in FIGS. 2 and 4. A plurality of strands 37 are discharged from the die 36. The strands have a generally helical molecular orientation. The strands 37 are passed to a heat treating means 38 wherein beneficially they are cooled in the unfoamed state below their thermoplastic temperature, or alternately, if desired, they are cooled in their foamed state below their thermoplastic temperature. The strands 37 passing from the heat treating means 38 are fed to a comminuting apparatus or means 39 which beneficially may be a breaker roll having a plurality of axially extending knives operating against a rubber roll to sever the strands 37 into a plurality of particles 41.

The method of the present invention is useful with a wide variety of expandable synthetic resinous materials such as are disclosed in U.S. Pat. Nos. 3,066,382; 3,251,728 and 3,188,264, herewith incorporated by reference.

For purposes of illustration, an apparatus is employed substantially as depicted in FIG. 5 wherein the die 36 has 300 openings each 0.040 inch in diameter. Each of the openings is provided with an insert substantially as depicted in FIG. 2 wherein the insert has an overall diameter of about one-fourth inch and an overall length of seven-eighths inch. The helical groove has a ⅛ inch pitch. The width of the helical groove is about 0.75 inch and has a depth of about 1/16 inch. The extruder supplies a stream of heat plastified polystyrene containing 6 parts of normal pentane per 100 parts of polystyrene and about 1500 parts per million based on the polystyrene of calcium stearate. Heat plastified foamable polystyrene is extruded at a rate of about 62 pounds per hour into a water bath having a temperature of about 25° C. The strands are removed from the water bath and passed through an air blast to provide a temperature of about 55° C. The strands are then passed to a breaker where they are cut into lengths of about 1.5 inches. The breaker is operated at a linear speed slightly in excess of the speed of extrusion to provide about a 25 percent stretch. The severed particles are placed in a hot air oven at about 100° C. They expand to provide particles similar in appearance to that of FIG. 1 and are eminently suited for many packaging applications. When the breaker is operated at a reduced speed such that no stretch is given to the strands issuing from the die, they exhibit a generally helical configuration such as is shown in FIG. 1, but with a reduced pitch. On raising the extrusion temperature to a temperature sufficient to cause foaming of the extruded strands, generally helical foamed strands are obtained. When generally similar conditions are employed utilizing a single hole die wherein a helical passage having a maximum helix diameter of about one-fourth inch, passage diameter of about 0.72 inch formed in the die plate by electrical discharge machining, a strand is obtained which appears to have a higher degree of molecular orientation than in the foregoing illustration and on foaming forms a tighter helix; that is, a helix having a smaller pitch.

Similar beneficial results are achieved employing foamable polymethylmethacrylate, foamable polyvinyl chloride, foamable nylon compositions and the like. In all cases, the helical strands are suitable as a pour-type packing or dunnage material.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a method for the preparation of synthetic resinous dunnage material, the method comprising
   providing a heat plastified expandable extrudable synthetic resinous composition,
   extruding the synthetic resinous composition to form at least one strand,
   severing the strand to provide a plurality of strand segments which can form a plurality of expanded or foamed strand segments, the improvement which comprises
   extruding the thermoplastic composition through a die having a generally helical die extrusion passageway immediately prior to the discharge end of the die, passing the thermoplastic composition through the helical die extrusion passageway, thereby imparting helical molecular orientation to the material within the die passageway and to the strand being extruded, the molecular orientation imparts a generally helical configuration to the strand segments when foamed.

2. The method of claim 1 including the step of subsequently foaming the strand segments to form a generally helical segment.

3. The method of claim 1 including the step of extruding the strands into a water bath below the foaming temperature of the composition and stretching the strands prior to severing into segments.

4. The method of claim 1 wherein the synthetic resinous composition is extruded at a temperature below its foaming temperature to provide a foamable strand.

5. In a method for the preparation of synthetic resinous dunnage material, the method comprising
providing a heat plastified expandable extrudable polystyrene composition,
extruding the composition to form at least one strand of a foamable polystyrene composition in a generally unfoamed condition,
severing the strand in the unfoamed condition to provide a plurality of strand segments which, on heating, form a plurality of expanded or foamed strand segments, the improvement which comprises
extruding the polystyrene composition at a temperature at which it is thermoplastic and below the foaming temperature thereof, through an extrusion die having a generally helical die passageway therein and a discharge end, the discharge end of the die passing the polystyrene composition through the helical passageway thereby imparting generally helical molecular orientation to the material within the die passageway and to the strand being extruded, the molecular orientation imparts a generally helical configuration to the strand segments when foamed.

6. In a method for the preparation of synthetic resinous dunnage material, the method comprising
providing a heat plastified expandable extrudable synthetic resinous composition
extruding the synthetic resinous composition to form at least one strand,
severing the strand to provide a plurality of strand segments which form a plurality of expanded or foamed strand segments on emerging from the die, the improvement which comprises
extruding the thermoplastic composition through a die having a generally helical die extrusion passageway immediately prior to the discharge end of the die, thereby imparting helical molecular orientation to the material within the die passageway and to the strand being extruded, the molecular orientation imparts a generally helical configuration to the strand segments when foamed.

* * * * *